March 15, 1966 K. ALBERS 3,240,440

REELING DEVICE

Filed April 25, 1963 8 Sheets-Sheet 1

INVENTOR
KARL ALBERS
BY: Toulmin & Toulmin
ATTORNEYS

INVENTOR
KARL ALBERS
BY: Toulmin & Toulmin
ATTORNEYS

INVENTOR
KARL ALBERS
BY: Toulmin & Toulmin
ATTORNEYS

March 15, 1966 K. ALBERS 3,240,440

REELING DEVICE

Filed April 25, 1963 8 Sheets-Sheet 4

INVENTOR

KARL ALBERS

BY: Toulmin & Toulmin

ATTORNEYS

INVENTOR
KARL ALBERS
BY: Toulmin & Toulmin
ATTORNEYS

March 15, 1966 K. ALBERS 3,240,440

REELING DEVICE

Filed April 25, 1963 8 Sheets-Sheet 6

INVENTOR
KARL ALBERS

BY: Toulmin & Toulmin
ATTORNEYS

March 15, 1966 K. ALBERS 3,240,440
REELING DEVICE
Filed April 25, 1963 8 Sheets-Sheet 7

INVENTOR
BY: KARL ALBERS
Toulmin & Toulmin
ATTORNEYS

March 15, 1966 K. ALBERS 3,240,440

REELING DEVICE

Filed April 25, 1963 8 Sheets-Sheet 8

INVENTOR
KARL ALBERS
BY:
Toulmin & Toulmin
ATTORNEYS

United States Patent Office 3,240,440
Patented Mar. 15, 1966

3,240,440
REELING DEVICE

Karl Albers, Wilhelmshaven, Germany, assignor to Olympia Werke Aktiengesellschaft, Wilhelmshaven, Germany Filed Apr. 25, 1963, Ser. No. 275,771
Claims priority, application Germany, Nov. 2, 1962, O 9,051
30 Claims. (Cl. 242—55.12)

The present invention relates to a controllable reeling device, for reeling and/or unreeling tapes or wires, such as storage tapes used in data processing devices, for example, magnetic tapes, punched tapes or wires.

More particularly, the invention relates to a friction drum drive wherein a reeling drum follows the rotation of a continuously driven shaft.

A major problem in reeling is to drive the reels, spools, and/or drums so as to accommodate the increasing or decreasing diameter of the wound tape so that on one hand, the tape even though being pulled is only slightly subjected to mechanical tension, while on the other hand a constant speed of traverse across the processing station is being imparted upon the tape. Usually, a high precision system actually drives the tape at the processing station to ensure very accurately a constant speed for processing.

According to one aspect of the present invention in a preferred embodiment thereof, it is suggested to have a reeling drum subjected to a follower motion imparted thereupon by rolling bodies which are in frictional contact either with the drum itself or an element positively following the drum's rotation. The rolling bodies are caused to roll on such drum or element, and rolling is effected by an element rotating with a driving shaft and extending radially therefrom. These rolling bodies are torque transfer elements for imparting the rotation of the driving shaft upon the reeling drum, but still permitting oppositely directed drum rotation. Additionally, provision is made for engagement and/or disengagement of the rolling bodies with either of the aforesaid elements.

It is, therefore, an object of the present invention to provide for a new drive for a reeling drum whereby such drum can either reel freely for fast advance or reverse of the tape, or the drum can tension the tape to a limited degree, or it is braked for quick stop.

While the specification concludes with claims particularly pointing out and distinctly claiming the subject matter which is regarded as the invention, it is believed that the invention, the objects, and features of the invention and further objects, features and advantages thereof will be better understood from the following description taken in connection with the accompanying drawing in which:

Figure 1:
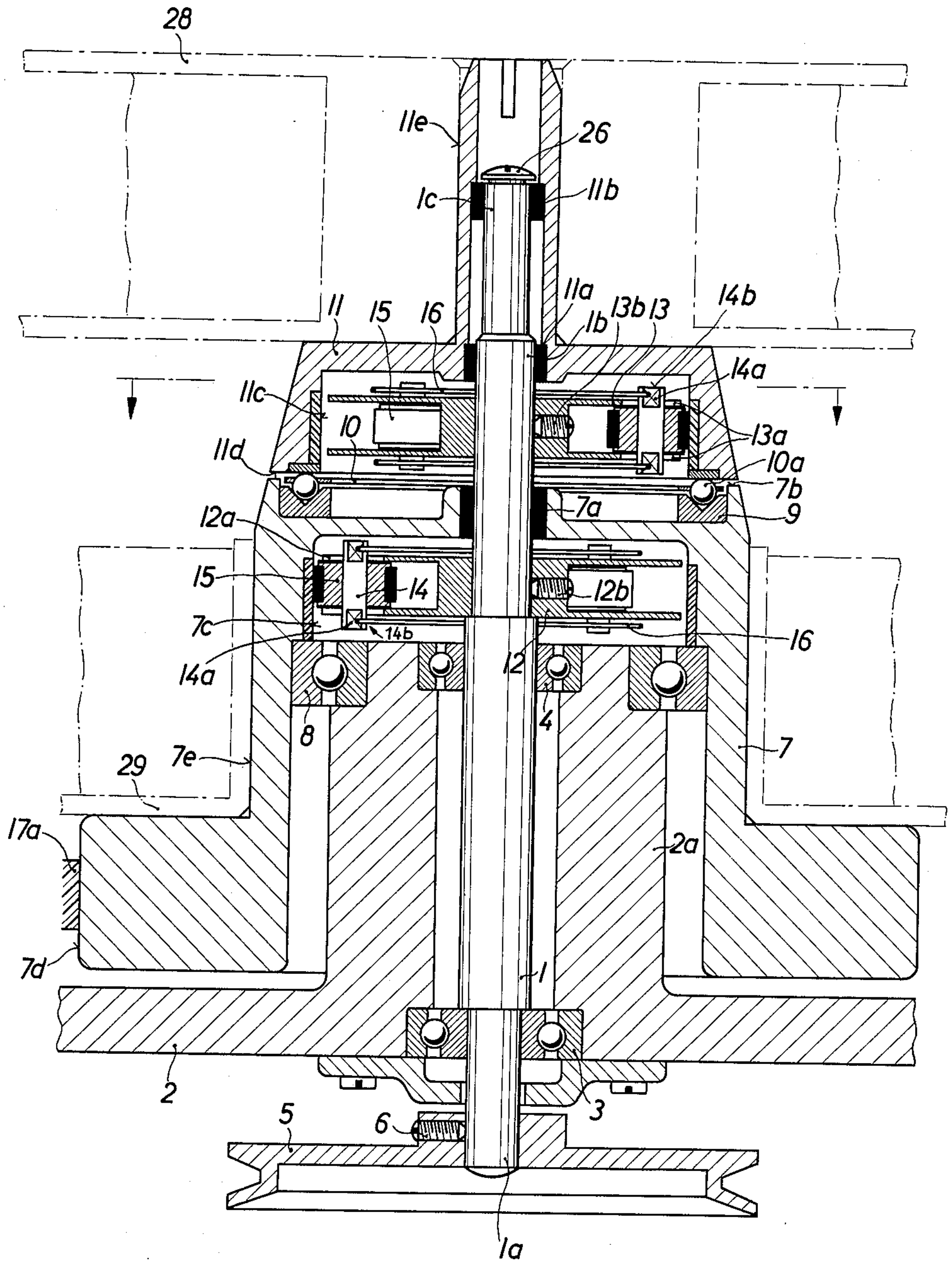
FIGURE 1 is a cross section through a first embodiment of the invention with two coaxial spools to be reeled, and balls as rolling bodies and torque transfer elements.

The winding or reeling device of FIGURE 1 has a feed or reel-off spool 29 and a bobbin or take-up spool 28 coaxially journaled on a driving shaft 1. Shaft 1 is journaled in collar or tube 2*a* of a stationary girder or frame plate 2 by means of ball bearings 3 and 4. Shaft 1 is continuously driven by a motor (not shown) to which it is drivingly connected by a V-belt pulley 5 screwed to a projection 1*a* of shaft 1 by means of a set or headless screw 6.

Shaft 1 has a further portion 1*b* of reduced diameter on which is seated a bushing 7*a* for rotatably supporting a feed drum 7 and is also journaled on collar 2*a* by means of ball bearings 8. Drum 7 has a front face carrying a prism ring 9 with a V-shaped annular groove receiving balls 10*a*. Balls 10*a* are disposed in a cage 10.

A reeling drum 11 for take-up spool 28 has a sleeve 11*e* supporting tightly fitted bushings 11*a* and 11*b* for journaling drum 11 on shaft projections 1*b* and 1*c* respectively of shaft 1. Reeling drum 11 has an annular shaped face 11*d* facing drum 7 and engaging balls 10*a* of cage 10. Thus, drum 11 actually rests on drum 7. The drums 7 and 11 can be restricted against excessive axial displacements by means of a head screw 26 screwed into the front or top end shaft of projection 1*c*, but radially projecting therefrom. Thus, the head of screw 26 is capable of limiting (in the drawing) upward movement of bushing 11*b* and thus of drum 11.

The drums 11 and 7 are follow the rotation of shaft 1 due to friction resulting from the cooperation of roller bodies and especially provided portions of the drums. For this purpose shaft 1 supports two roller carriers 12 and 13 having the configuration of spools and being screwed by means of headless screws 12*b* and 13*b*, respectively, to driving shaft portion 1*b*. Roller carriers 12 and 13 are respectively assigned to drums 7 and 11 and they are similarly shaped. Each roller carrier is housed inside of the drum to which it pertains.

The roller carriers have radially extending guiding slots 12*a* and 13*a* respectively (see also FIGS. 2 and 3) receiving bolts 14 which in turn support cylindrically shaped rolls 15. Bolts 14 have flattened ends 14*a* which are the portions actually received by the slots 12*a* and 13*a* for guidance therein. The flattened portions 14*a* are further provided with engraved grooves 14*b*, respectively, receiving ring springs 16 (FIG. 2—two for each carrier) so that the rollers 15 permanently engage the inner mantles 7*c* and 11*c* of the drums.

Figure 2:
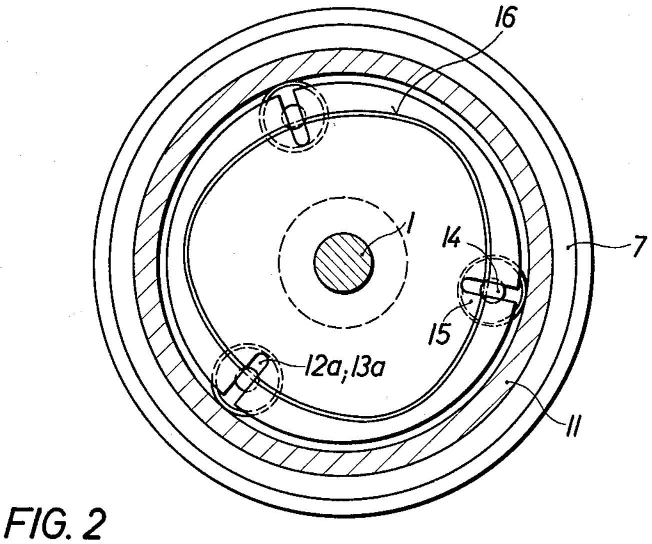
FIGURE 2 is a sectional view taken along line II—II in FIGURE 1.
Figure 3:
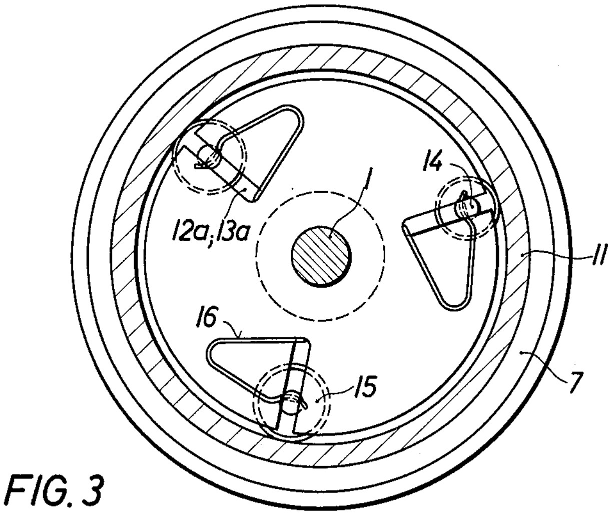
FIGURE 3 is a modification of the embodiment shown in FIGURE 1 and in similar view as FIGURE 2.

FIG. 3 shows that the ring spring 16 of FIG. 2 can be substituted by individual clip springs for each bolt end.

The inner mantles 7*c* and 11*c* of the drums, and/or the outer mantles of rolls 15 may be covered by an elastic coating, for example, a coating of a plastic, for reducing noise. In case the rotational speed is sufficiently high, springs 16 can be eliminated since the rolls 15 then are urged by sufficiently strong centrifugal forces against the inner mantle of the drum to which they pertain.

Either spool 28 and 29 is seated on the reeling drum to which it pertains and follows the rotation thereof. Shaft 1 is driven continuously through pulley 5 and thus roller carriers 12 and 13 also rotate continuously. Due to centrifugal force and tension force exerted by springs 16 upon the several rolls 15, the latter engage the reeling drums and roll along the inner mantles thereof. The friction produced causes the drums to follow such rotation. The bearing friction as between rolls 15 and the associated bolts 14 is added to the surface friction resulting when rolls 15 run over inner mantle surfaces while being urged against them by the springs 16. These combined friction forces result in a frictional torque acting upon drums 7 and 11 for driving same with the driving torque being derived from shaft 1.

Figure 4:
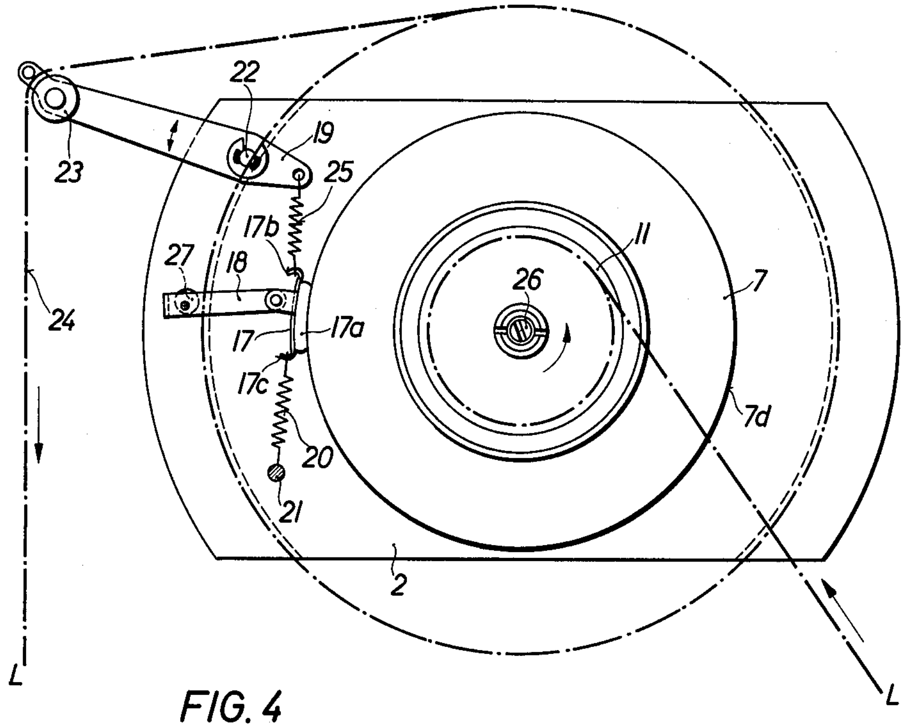
FIGURE 4 is a top view of the reeling device shown in FIGURE 1 with additional elements for controlled braking.

Drum 7 (see FIGS. 1 and 4) is further provided with an outer mantle *7d* cooperating with a brake layer *17a* of a brake shoe 17 linked to a brake lever 18. Brake 17 is adjustably supported on stationary girder or frame plate 2 by means of an eccentric stud 27. A tension spring 25 is secured to a lug *17b* of brake shoe 17 connecting the brake shoe to one arm of a control lever 19. Another tension spring 20 connects a lug *17c* of brake shoe 17 with a stationary bolt 21 on girder 2.

Control lever 19 is pivoted upon a bolt 22 also on girder 2. Control lever 19 thus is a two arm lever with one arm engaging spring 25 while the other arm supports a pulley 23 cooperating with a storage tape 24 to be reeled. As is shown schematically, tape 24 is unwound from spool 29 and guided by pulley 23 into a processing station L—L from which it is fed for rewinding on take up spool 28.

Springs 20 and 25 for brake shoe 17 are selected and proportioned so that in case the reeling tension of tape 24 decreases, control lever 19 pivots clockwise around its pivot 22. Hence, spring 20 will cause brake lever 18 to likewise pivot clockwise around its pivot 27. The resulting radial movement of brake 17 causes brake layer *17a* to effectively engage mantle *7d* of feed drum 7 on which is seated the feed spool 29. In operation the following result will be observed:

Rotating and driving shaft 1 drives the roller carriers 12 and 13 which are connected thereto. Thus rolls 15 run on the inner mantles *7c* and *11c* and thus drive drums 7 and 11, respectively, as was stated above. One can see from FIG. 4 that the carrier 24 is tensioned between the schematically indicated processing station L—L and drum 11.

At the beginning, the processing station L—L, for example, a punching station, and tape 24 are at rest. Drum 11 is not capable of pulling tape 24 through the station L—L. In other words, the torque transmitted from shaft 1 upon drum 11 through rolls 15 is not strong enough to pull tape 24 through station L—L. Only after punching station L—L itself is being started, for example in that the capstan drive of the station starts to advance the tape, this tape can, in fact, be reeled and wound up bobbin 28.

As long as station L—L with its capstan is by itself at rest, feed drum 7 with spool 29 runs at first until springs 20 and 25 at brake shoe 17 pivot lever 19 clockwise, due to the roll 23 engaging carrier tape 24. Clockwise pivoting of lever 19 places brake shoe 17 into frictional engagement with outer mantle *7d* of feed drum 7 and brakes the latter so that drum 7 comes to a complete stop. Upon starting punching station L—L, carrier 24 is advanced by the capstan in station L—L and thereby through engagement with pulley 23 counterclockwise pivots control lever 19 so that the brake shoe 17 is released. Drum 7 then can be driven freely by the rolls 15 as aforedescribed and feeds tape 24 to station L—L accordingly.

The aforedescribed embodiment of the invention will still operate successfully when springs 16 are being omitted and when rolls 15 are urged by centrifugal force only against mantles *7c* and *11c* of drums 7 and 11, respectively, so that frictional engagement is found between rolls and drums. Thus, springs 16 are only optional to re-enforce the friction force by providing an additional normal force as between rolls and drums.

Figure 5:
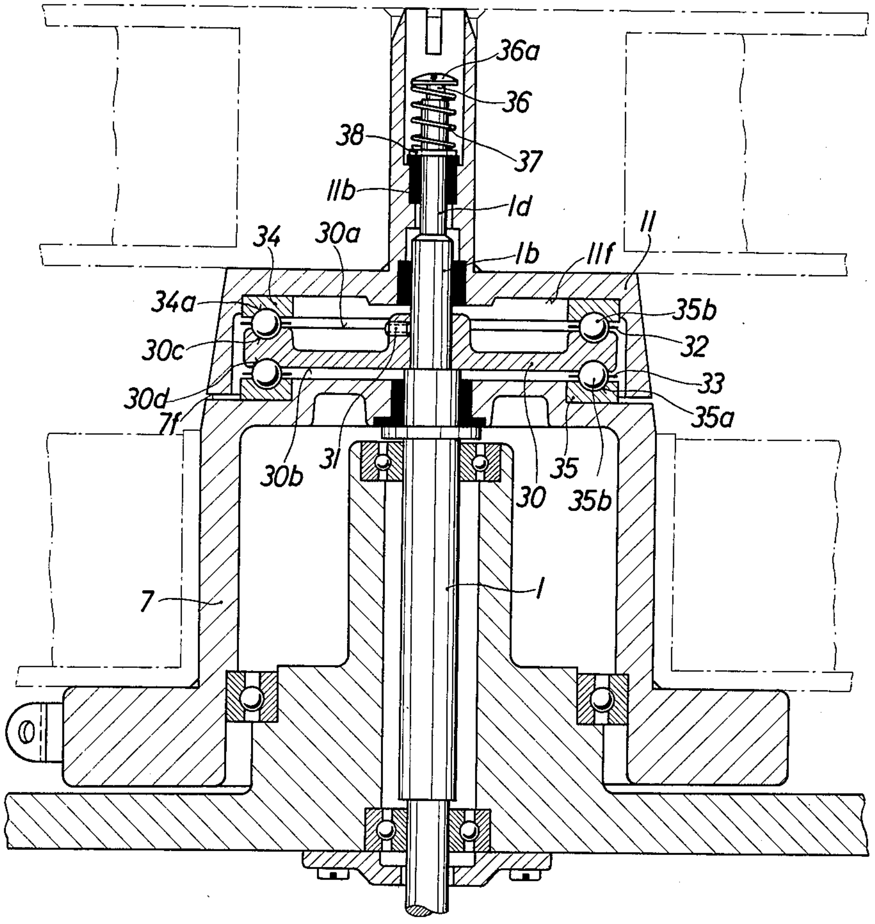
FIGURE 5 is a sectional view showing another embodiment of the invention with balls as rolling bodies.

Proceeding now to FIG. 5, there is shown another embodiment of the invention wherein balls are used for power and torque transmission from driving shaft 1 to reeling drums 7 and 11. There is a driving disc 30 secured by a headless screw 31 to shaft portion *1b* and positively rotating therewith. Disc 30 has upper and lower sides *30a* and *30b* respectively, which are provided with ring shaped ball cups *30c* and *30d*, individually receiving several balls *35b* arranged in two cages 32 and 33.

The balls *35b* in cage 32 roll in a ring shaped ball cup of an annulus 34 integral with or secured to the inside downwardly directed bottom surface *11f* of drum 11. The balls *35b* in cage 33 run in a ball cup *35a* of an annulus 35 which is integral with or secured to upwardly directed outer bottom face *7f* of drum 7. The upper shaft portion *1d* has a bore hole receiving an adjusting screw 36 having a head *36a* which engages and acts upon a compression spring 37. Spring 37 in turn urges a disc or washer 38 against a sinter metal bearing *11b* with which a sleeved drum 11 is journalled upon shaft portion *1d*. Thus, spring 37 provides for an axially directed force with which drum 11 is urged downwardly against disc 30 so as to cause frictional driving engagement and torque transmission between shaft 1 and drum 11, in axial direction by the balls *35b* in cage 32. This arrangement can thus be maintained assembled while enabling adjustment of the several forces acting upon the reeling drums. The other elements as well as the mode of operation and function of this embodiment corresponds to that described with reference to FIGS. 1 and 4.

Figure 6:
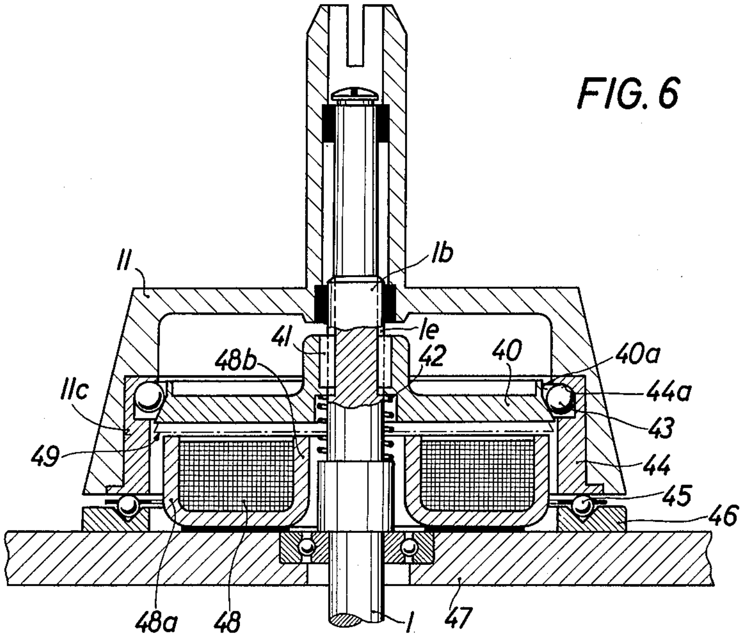
FIGURE 6 is a sectional view showing a single drum reeling device with balls as rolling bodies and electromagnetic braking.

In FIG. 6 an intermediate shaft portion *1b* is provided with axial grooves *1e* slidingly receiving wedges 41 which are secured to a driving disc 40. This arrangement enables axial adjustment of driving disc 40 while ensuring that disc 40 positively follows the rotation of shaft 1. Disc 40 is thus capable of torque transmission from shaft 1.

A spring 42 is wound around shaft 1 and urges a conical outer or circumferential surface *40a* of disc 40 against driving balls 43. The drum 11 here may be made of plastic, light metal or the like, and it is provided with a ring shaped insert 44 fitting into drum 11 and having an annular ball cup *44a* at its upper end to receive driving balls 43. The balls 43 are kept in a cage. The insert 44 rests with its downwardly directed annular lower end on balls 45 received in a prism ring 46 having an annular groove. Ring 46 rests on or is secured to a stationary frame member or portion 47. Thus, ring 46 actually supports all of the elements pertaining to drum 11 and is journalled on shaft 1.

On stationary frame 47 is further mounted a ring shaped electromagnet 48 receiving shaft 1 in coaxial relationship thereto. The outer diameter of magnet 48 is slightly smaller than that of disc 40. Disc 40 constitutes itself the cooperating armature for the electromagnet. Upon energization, magnet 48 attracts disc 40 against the tension of spring 42 until the lower edges of wedges 41 rest against and upon the lower ends of the respective grooves *1e* of disc 40. Hence, an air gap 49 still remains between driving disc 40 and the upwardly projecting core legs *48a* and *48b* of magnet 48. This air gap prevents disc 40 from sticking at legs *48a* and *48b* during or after magnetization thus enabling continued rotation of disc 40 above stationary magnet 48 while still remaining in the attracted position. However, in its attracted position armature disc 40 is out of driving connection with balls 43 so that the coupling between shaft 1 and drum 11 is interrupted.

When magnet 48 is not energized, spring 42 urges disc 40 with its conical surface *40a* upwardly towards driving balls 43 so that shaft 1 transmits rotation via disc 40, balls 43 upon drum 11. The balls 43 roll in-between the conical surface 40*a* and the ball cup 44*a*. The surface friction of balls 43 causes drum 11 to follow the rotation of shaft 1.

If a storage tape 24 (not shown—corresponding to FIGS. 1 and 4) is to be reeled, the tape is subjected to the pull of drum 11 as against the punching station. If the reeling power of drum 11 is to be terminated temporarily, simply the electromagnet 48 will be energized as long as needed. Upon such energization disc 40 is pulled down into the dash-dotted position as stated and consequently the driving connection between disc 40 (shaft 1) and drum 11 is then interrupted for the time magnet 48 remains energized. The device of FIG. 6 actually is only a single spool reeling device. However, having in mind the aforedescribed twin-pool arrangement (FIG. 1 and FIG. 5) it can readily be seen how FIG. 6 can be modified to have two spools and two coaxial electromagnets.

If the principal device of FIG. 6 is to be used in a tape recorder or the like, i.e., a device not having coaxial bobbin and feed spool, the drums then have to be arranged side by side. In this case one will need a separate driving shaft for each drum as well as a fast operating brake. The following embodiments refer to such subject matter.

Figure 7:
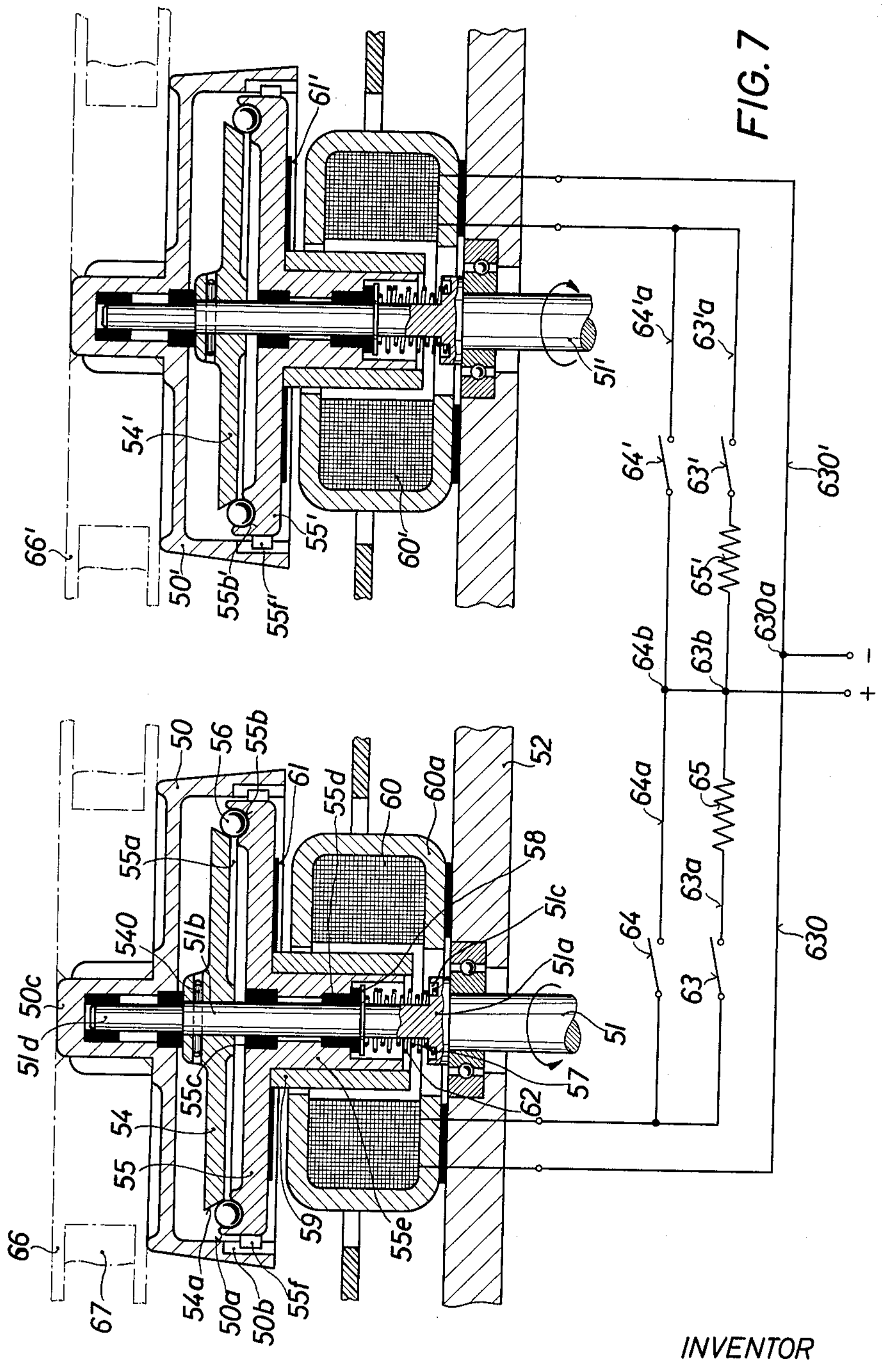
FIGURE 7 is a sectional view showing a reeling device with two axis parallel reeling drums, balls as rolling bodies and individual electromagnets for braking.

In FIG. 7, there are shown two similar reeling drums, each journalled on a shaft. Since basically the two units are of similar construction, not all parts of the right hand unit have been identified by reference numerals and those identified have reference numerals similar to those identifying the several elements of the left hand unit while a 1 is being used for distinguishing components of the right hand from those of the left hand unit.

There are thus two drums 50 and 50′ driven by shafts 51 and 51′, respectively, and in opposite directions. There is a stationary plate 52 which may be common to both units and in which the shafts 51 and 51′ are journalled; for balancing reasons there may be provided a second stationary supporting plate (not shown) for still further journalling each of the shafts. Shaft 51 is provided with a portion 51*b* of smaller diameter to which is secured a driving disc 54 by means of pin 540. Disc 54 has a conical circumferential surface 54*a*.

Two bushings 55*c* and 55*d* are rotatably and axially displaceably seated on shaft portion 51*b*. These two bushings pertain to a transmission disc 55 having an upwardly directed annular front face 55*a* provided with a ring shaped ball cup 55*b* in which there are running balls 56. There is a spiral spring 57 disposed around the lower portion of shaft portion 51*b* engaging a collar 51*a* of shaft 51. This spring 57 urges a washer 58 against bushing 55*d* of disc 55, and thus it urges the balls 56 against the conical operating surface 54*a* of driving disc 54.

A collar 55*e* pertaining to disc 55 supports and is secured to a sleeve 59 made of iron. Disc 55 including collar 55*e* may be made of light metal, plastics, etc. Sleeve 59 serves as plunger type armature for an electromagnet or solenoid coil 60 with core legs 60*a*. This magnet is secured to plate 52 coaxially to shaft 51.

The downwardly directed side of disc 55 is provided with a brake lining 61 cooperating with the outer and upper surface portion of legs 60*a*. Another spring 62 is provided around spring 57, but the former is shorter and stronger than the latter. Spring 62 is seated in a ring groove 51*c* of collar 51*a*. There is sufficient play provided in-between spring 62 and washer 58, being of the diameter corresponding to about half of the air gap width between brake lining 61 and core 60*a*.

Magnet 60 is electrically connectable by two individually operable switches 63 and 64 to power supply lines 63*a* and 64*a*. Both lines 63*a* and 64*a* are interconnected to and at the plus pole of a suitable D.C. voltage source. There is a return wire 630 for connecting magnet 60 to the minus pole of the said voltage source.

a resistor 65 is inserted in line 63*a* thus is connected in series with coil 60 whenever switch 63 has been closed. Resistor 65 is dimensioned so that the magnet energizing current permitted to flow upon closing of switch 63 produces an attracting force which is about half of that produced when switch 64 is closed bridging resistor 65. Switches 63 and 64 are manually operable by appropriate control buttons.

When either switch 63 and 64 is closed magnet 55 attracts armature 59 and pulls it down thereby compressing spring 57 until bushing 55*d* with washer 58 engages spring 62. In case switch 63 is closed, the then existing reduced attraction force is insufficient to also cause compression of spring 62, thus in this case only the balls 56 are removed from driven disc 54.

If switch 64 has been closed, the full attraction power then available is capable of prevailing over the tension force of spring 62 so that disc 55 will, in fact, be placed by armature 59 into a position in which the brake lining 61 frictionally engages leg 60*a* of magnet 60.

On shaft end portion 51*d* is journalled a drum 50 engaging driven disc 54. Drum 50 has an inner mantle 50*a* provided with axially extending grooves 50*b* into which project follower lugs 55*f* projecting from transmission disc 55.

Drum 50 is being driven or brakes through the follower lug 55*f* on transmission disc 55 which in turn is either being driven through balls 56 and disc 54 or braked through magnet 60. Thus, there is positive connection between disc 55 and drum 50 while permitting relative axial displacement.

Reel 66 carrying a magnetic tape 67 is attachably disposed on tang or stud 50*c* of drum 50.

Having described the left hand driving unit, it will now be understood that there is a counterpart for every element in the right hand unit, the magnet 60′ of which is electrically connected to the same voltage source. The two drums 50 and 50′ reel the same tape. The only difference between the two units is the direction of rotation. Accordingly, transmission discs 55 and 55′ rotate in opposite directions whenever the respective driving discs 54 and 54′ cause balls 56 and 56′ to revolve in ball cups 55*b* and 55*b′*, respectively. Since transmission discs 55 and 55′ are drivingly connected to drums 50, 50′ respectively by means of follower lugs 55*f*, 55*f′*, respectively, reels 66 and 66′ likewise rotate in opposite directions. Drum 50′ with reel 66′ thus winds up tape 67, while the tape 67 is reeled off reel 66 against the rotation imparted upon drum 50. Thus, drum 50 is braked by the driving balls 56; hence, the tape 67 is placed under tension which ensures uniformity of the unwinding thereof.

Known tape recorders are provided with a quick-stop device for instantly stopping the tape whereby upon actuation of an appropriate button a so-called tape pressure lever is lifted so as to interrupt the capstan driving the tape at the tape operating or processing station.

In the instant embodiment, the quick-stop button actuates also the contact 64 for directly governing energization of the magnet 60. The quick-stop button closing contact 64 initiates attraction of armature 59 with disc 55 for braking same. The tape will thus be stopped instantly at the position it has upon such actuation. Since drum 50′ remains in driving connection, the tape will remain under tension. Upon release of the quick stop, contact 64 is opened, and the tape is transported anew instantaneously.

Another requirement of the magnetic tape recorder is to enable extraordinarily fast forward or reverse movement of the tape. For fast forward movement, an appropriately provided actuating button closes contact 63. Magnet 60 attracts armature 59 at reduced power due because resistor 65 limits the available current as aforedescribed; transmission disc 55 is lowered only to merely engage strong spring 62 without compressing same. Hence, the driving connection between discs 54 and 55 through balls 56 is interrupted but disc 55 with drum 50 and reel 66 is not braked. The still driven drum 50′ can reel the tape without braking or tensioning through the left hand unit.

Accordingly, to trigger fast transport reversal, an appropriate button actuates and closes contact 63′ so that magnet 60′ is energized via resistor 65′ at reduced power thus placing disc 55′ with drum 50′ out of driving engagement with transmission disc 54 but without braking. Now the left hand unit takes over completely for driving the tape in reverse direction unhampered by any tensioning from the right hand unit.

For interrupting either fast advance or fast reversal, the tape recorder can be provided with a "stop"-button closing both contacts 64 and 64′ to fully energize both magnets 60 and 60′ thus circumventing resistors 65 and 65′ so that both discs 55 and 55′ are placed into braking position. The tape will then be stopped regardless in what direction it was moving prior to the stop command. The tape drive capstan mechanism in the operating station can likewise be stopped thereby.

Figure 8:
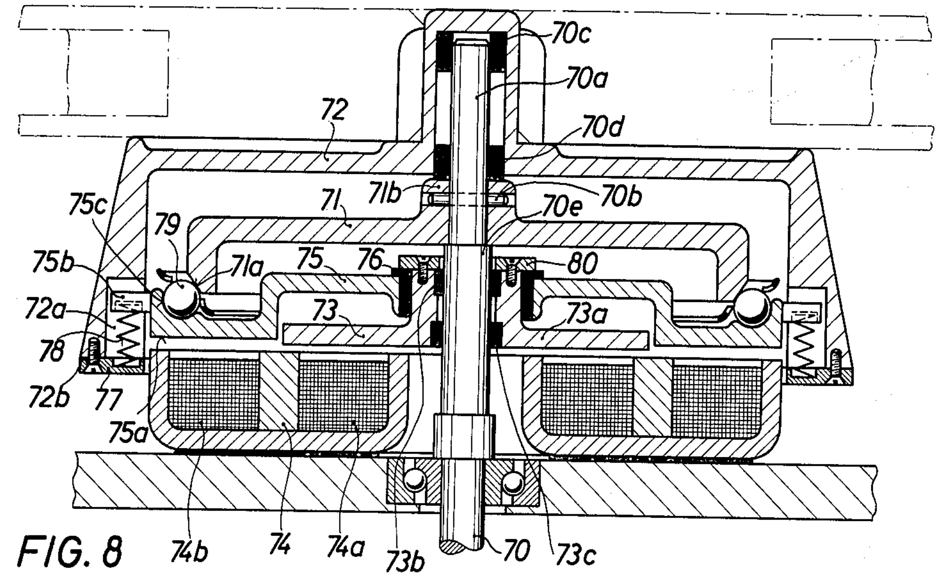
FIGURE 8 is a sectional view showing another embodiment of the invention with one reeling drum and two concentrical electromagnets for controlling free reeling, braking and drive.

In FIG. 8 there is shown an embodiment having two magnetic coils for each reel driving unit. Since again takeup and reel off units are considered similar, only one thereof is shown.

A driving shaft 70 has a shaft 70*e* with relatively reduced diameter and a still further diameter reduced shaft end portion 70*a* carrying at its lower end a driving disc 71 secured to the shaft by a pin 70*b* and rotating therewith. Disc 71 has a conically shaped front face 71*a*.

The upper part of shaft end portion 70*a* receives bearings 70*c* and 70*d* for journaling a drum 72 with bearing 70*d* resting on collar 71*b* of driving disc 71.

Shaft portion 70*e* receives bushings 73*b* and 73*c* for journaling a disc 73. This disc 73 provides and constitutes the armature cooperating with a coil 74*a* of a divided, ring shaped or trough shaped pot magnet 74. Collar 73*a* of disc 73 receives a bushing 76 of a transmission disc 75 that is journaled on collar 73*a*. Downwardly directed annular front face 75*a* of disc 75 serves as armature for coil 74*b* of pot magnet 74. The outer mantle of disc 75 supports a follower lug 75*b* projecting into grooves 72*a* of drum 72. In-between the several lugs 75*b* and an annulus 77 there are provided several compression springs 78. Annulus 77 is secured to front face 72*b* of drum 72. Springs 78 urge driving balls 79 towards conical circumference 71*a* of driving disc 71. The balls 79 are received in a ball cup 75*c* of disc 75. Springs 78 further maintain drum 72 on shaft 70.

A ring 80 is secured to collar 73*a* of disc 73 which ring engages bushing 76 of transmission disc 75 and thus disc 73 is supported by this disc 75.

The driving disc 71, driving balls 79, transmission disc 75 and reeling drum 72 cooperate as do elements 54, 56, 55 and 50, respectively of FIGURE 7 with the magnet not being energized.

The provision of the additional transmission disc 73 has the following purpose: If for fast tape advance or reverse the driving connection to drum 72 is to be interrupted, an appropriate control button causes energization of winding 74*a* of divided magnet 74. Accordingly, disc 73 will be attracted and in turn disc 73 through ring 80 pulls disc 75 down against the tension of springs 78. This action now interrupts the rolling drive for disc 75. Whenever disc 73 is fully attracted, disc 75 still sufficiently clears magnet 74 so as not to be braked, but the balls 79 on disc 75 are out of engagement with disc 71.

Whenever coil 74*b* is energized, disc 75 is fully attracted and is thus not only disengaged from disc 71, but also full braking occurs.

Two devices of the type as illustrated in FIGURE 8 may cooperate as was described in FIGURE 7. In FIGURE 7 two switches 63 and 64 (and 63′, 64′) for each unit controlled half and full power to be applied to an electromagnet, while in FIGURE 8 two magnets are individually energized via two corresponding switches governing individual energizing circuits for coils 74*a* and 74*b* which in turn produce different degrees of displacement of disc 75. Cooperation between two units of the type shown in FIGURE 8 can be had by two corresponding control switches for each unit, and thus similar cooperative effects of such two units are attainable as compared with those in FIGURE 7.

Figure 9:
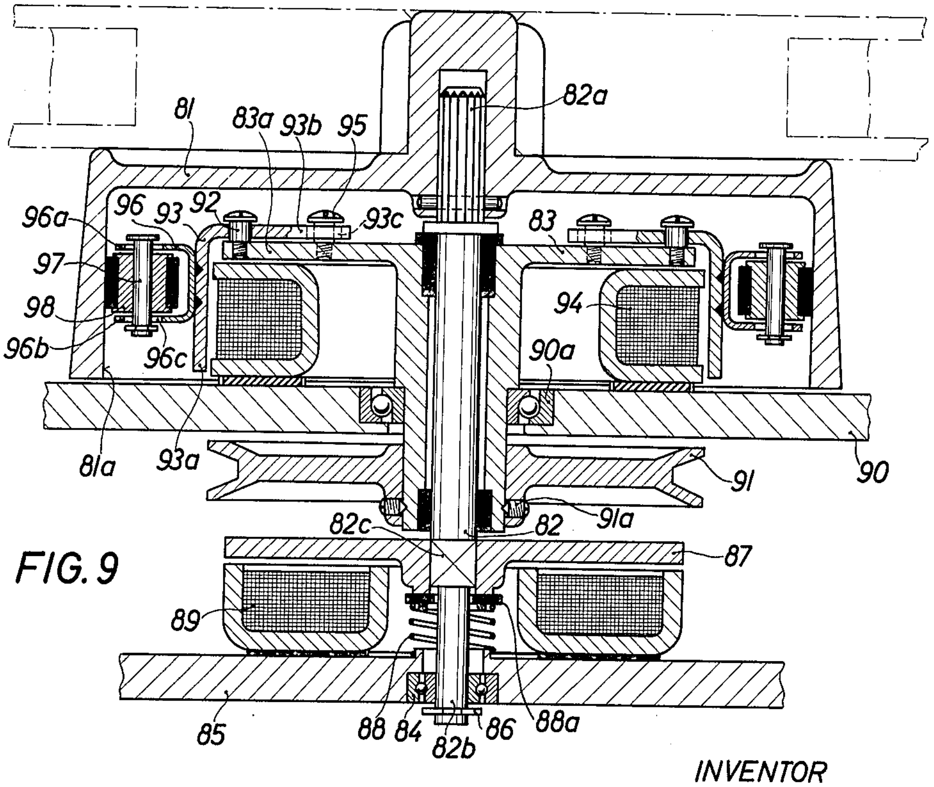
FIGURE 9 is a cross sectional view showing another embodiment of the invention, with two coaxial electromagnets for controlling and rolls as torque transfer elements.
Figure 10:
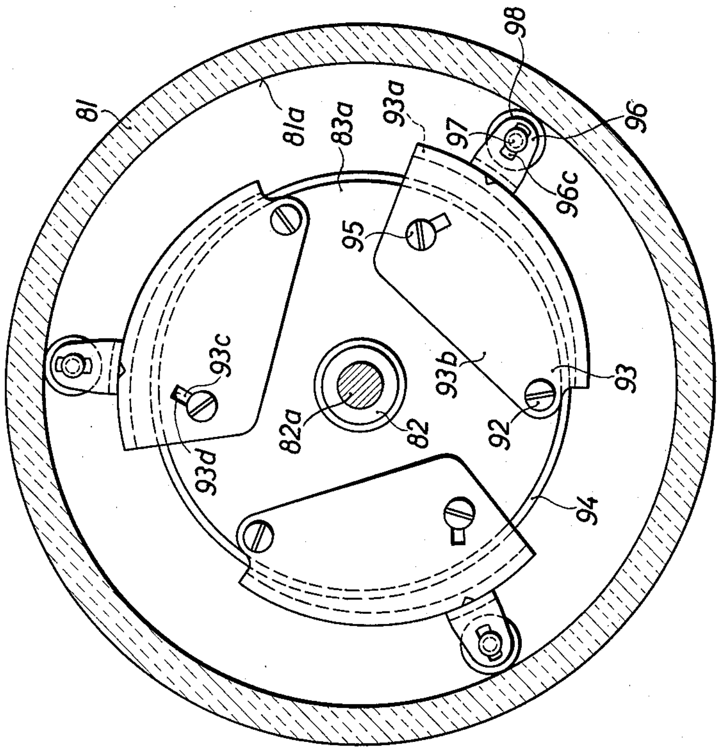
FIGURE 10 is a sectional view of the device illustrated in FIGURE 9, taken along lines X—X therein.

FIGURES 9 and 10 illustrate a further embodiment of the invention, also related for reeling in tape recorders. Again, two similar units of the type illustrated in these two figures will be provided in a tape recorder.

In this embodiment there are provided two completely separated magnets 89 and 94 and driving connection is provided by rolls. A shaft 82 has an upper end portion 82*a* which is corrugated. A drum 81 is attached to upper shaft portion 82*a*. A lower shaft portion 82*b* is journaled by means of ball bearings 84 in a stationary frame plate 85. Safety washer 86 secures proper positioning of shaft 82. A square portion 82*c* of shaft 82 supports a brake disc 87 which can slide axially on square portion 82*c*, but disc 87 is being positioned by a compression spring 88 and a washer 88*a*. Shaft 82 is not the main driving shaft but it is received in a hollow shaft 83.

A pot magnet 89 is secured to plate 85 having disc 87 as armature. There is a second stationary frame plate 90 provided above both, plate 84 and magnet 89 as well as other elements. Plate 90 is provided with a ball bearing 90*a* thus journaling the hollow shaft 83. This shaft 83 carrys a V-belt pulley 91 at its lower end and pulley 91 is secured to shaft 83 by a headless screw 91*a*. Pulley 91 is continuously driven. Shaft 83 at its upper end is further provided with a flange 83*a* supporting swivel armatures 93, the respective legs 93*a* of which cooperate with ring magnet 94. Armatures 93 each have another leg 93*b* having longitudinal slots 93*c* with edges 93*d* serving as stops (see FIGURE 10). There are screws 93 positioned in flange 83*a* respectively received in these slots 93*c*.

Upon energization of magnet 94 stop-edges 93*d* will abut screws 95, and thereby any further motion of the armature is prevented so that an air gap remains between magnet 94 and legs 93*a*. Hence, rotating hollow shaft 83 supporting armatures 93 will continue to rotate regardless whether or not magnet 94 is being or remains energized.

The legs 93*a* of armatures 93 each support a U-shaped roll carrier 96 having legs 96*a* and 96*b* with registering, radially extending pairs of slots 96*c* respectively receiving bolts 97. There are rolls 98 mounted on the bolts 97 for rolling along inner mantle 81*c* of drum 81.

Upon rotation of hollow shaft 83, the armatures 93 are subjected to centrifugal forces which forces pivot armatures 93 outwardly about pivots 92 so that rolls 98 will frictionally engage mantle 81*a* of drum 81 and roll therealong. The radial and outward movement of armatures 93 is limited by slots 93*c*; hence, rolls 93 supported in slots 96*c* will move radially away from the axis of shaft 83 due to their own centrifugal force so as to frictionally engage mantle 81 regardless of the restriction of movement of armatures 93. Drum 81 follows the rotation due to the surface friction when rolls 98 roll over mantle 81*a*. This is similar to the ball rolling of the previously described embodiments.

Drum 81 can be rotated more forcefully when the armatures 93 are not radially restricted by these slots 93*c* with the screws 95. In this case, the rolling pressure exerted by rolls 98 upon mantle 81*a* of drum 81 will be supplemented and re-enforced by the centrifugal forces of armatures 93 themselves. One may provide springs for the recoiling of the armatures as well as rolls 98 to ensure disengagement of rolls and drum upon braking or free reeling as controlled by the magnets.

Ring magnet 84 is provided for actually controlling the driving connection between rolls 98 and drums 81. Upon energizing of ring magnet 84, armature 93 will be attracted inwardly radially so that edges 93*d* of slots 93*c* abut screws 95 and rolls 98 are thus being lifted from mantle 81*a* of drum 81; the driving connection between drum 81 and shaft 83 is interrupted accordingly. However, no actual braking is produced.

Braking will be carried out by pot magnet 89. Upon energization braking disc armature 87 is attracted by magnet 89 against the tension of spring 88 engaging disc 88*a*. Regardless whether or not magnet 94 is energized, braking occurs since disc 87 positively follows the rotation of shaft 82 and since drum 81 is directly seated on shaft 82 the drum in turn positively follows the rotation and braking thereof.

In this embodiment, there will be one switch (not shown) governing the current supply to magnet 94 for controlling the driving connection between driving shaft 83 and drum 81 without braking, while another switch governs the current supply to magnet 89 for braking. Thus, two units of the type shown in FIGURES 9 and 10 can cooperate as was described in detail in connection with FIGURE 7 reiterated at the description of FIGURE 8.

Figure 11:
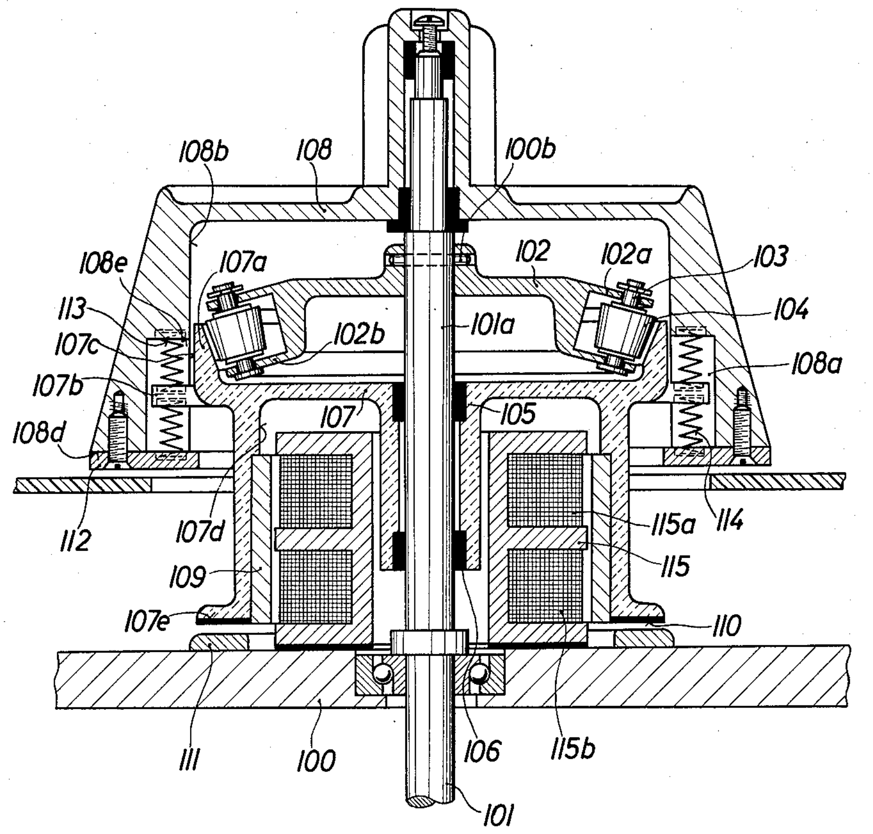
FIGURE 11 is a sectional view showing a still further embodiment of the invention with two coaxial controlling electromagnets and rolls as torque transfer elements.

Proceeding now to the last embodiment shown in FIGURE 11, again a unit for use in tape recorders is described.

A stationary frame plate 100 supports a bearing 100*a* for journaling a shaft 101. For proper centering there may be provided another frame plate with another bearing also journaling shaft 101. Shaft portion 101*a* is traversed by a pin 100*b* for securing a roll carrier 102 having its circumference formed so as to provide for two forks each having prongs 102*a* and 102*b* and receiving bolts 103 respectively journaling two conical rolls 104. Lower portion of shaft portion 101*a* receives bushings 105 and 106 for journaling a transmission drum 107 while permitting axial movement thereof.

Transmission drum 107 is provided with an upper front ring or annulus 107*a* having an inner conical surface matching the conical rolls 104 so that the latter can roll on a surface strip of this surface of ring 107*a*. Outer mantle 107*c* of drum 107 is provided with followers 107*b* projecting into grooves 108*a* of inner mantle 108*b* pertaining to a drum 108 journaled on shaft 101.

Tranmission drum 107 is made of plastic or light metal or the like, and to its inner mantle 107*d* there is secured an iron ring 109 serving as plunger type armature for a coil shaped magnet 115 secured to plate 100.

Transmission drum 107 is provided with a brake lining 110 at its lower front face 107*e* cooperating with a brake ring 111 secured to stationary frame plate 100.

Downwardly directed annular shaped front face 108*d* of drum 108 is provided with a ring disc 112 secured thereto. Compression springs 113 are disposed between ring disc 112 and lugs 107*b* while compression springs 114 are disposed between lugs 107*b* and the edges 108*e* of grooves 108*a*. These springs maintain transmission drum 107 in a resting position defined between brake ring 111 and rolls 104.

Magnet 115 has two coils 115*a* and 115*b* which can be energized individually. Coil 115*a* cooperates with armature 109 in that it pushes the armature upwardly, and drum 107 of course moves therewith. Upon such lifting of drum 107 the conical ring 107*a* enters rolling connection with rolls 104.

Upon energizing coil 115*b*, armature 109 with transmission drum 107 is pulled down then causing brake lining 110 to engage brake ring 111.

In this embodiment, rotation is transmitted from driving shaft 101 upon reeling drum 108 via the aforedescribed elements whenever the magnet, with coil 115*a* is being energized. Only upon energization of coil 115*a* transmission drum 107 engages rolls 104 on carrier 102, so that only then rolls 104 can roll over surface 107*a* of transmission drum 107. Driven transmission drum 107 then imparts rotation upon drum 108 through followers 107*b*.

In the aforedescribed embodiment, driving connection was had when no magnet was being energized.

For braking coil 115*b* is energized causing armature 109 to drop so that brake layer 110 of armature 109 frictionally engages stationary brake ring 111 for thus braking drum 108. It is apparent, that here for braking coil 115*a* must either be deenergized when coil 115*b* is energized for braking, or the attraction force produced by coil 115*b* sufficiently exceeds the attraction force produced by coil 115*a* so that energization of coil 115*b* can overcome the oppositely directed attraction as produced by coil 115*a*.

The follower effect or free reeling for drum 108 is here found when neither magnet is energized, since there is neither a driving engagement between elements 107–102 nor any braking.

The invention is not limited to the embodiments described above but all changes and modifications thereof not constituting departures from the spirit and scope of the invention are intended to be covered by the following claims.

What is claimed is:

1. Reeling device for tapes comprising: a stationary plate; a driving shaft journaled in said plate; a reeling drum for supporting a spool and being coaxially journaled on said driving shaft; means secured to and rotating with said drum and defining a frictionally engageable surface; a plurality of rolling bodies capable of engaging said surface and rolling thereon; means positively connected to said shaft and rotating therewith, said last named means carrying said rolling bodies adjacent the periphery thereof, and means for causing said rolling bodies to make rolling contact only with said surface for delivering a driving force to said reeling drum solely by rolling friction of the rolling bodies on said surface.

2. Reeling device for tapes comprising: a stationary plate; a driving shaft journaled in said plate; a reeling drum for supporting a spool and being coaxially journaled on said driving shaft, said drum having an inner rotational, frictionally engageable surface; a plurality of rolling bodies capable of engaging said surface and rolling thereon; means secured to said shaft and rotating therewith, said means carrying said rolling bodies adjacent the periphery thereof, and means for causing said rolling bodies to make rolling contact only with said surface for delivering a driving force to said reeling drum solely by rolling friction of the rolling bodies on said surface.

3. Reeling device for tapes comprising: a stationary plate; a driving shaft journaled in said plate; a reeling drum for supporting a spool and being coaxially journaled on said driving shaft; a rotational body drivingly connected to said drum and rotating therewith and defining a rolling surface; a plurality of rolling bodies maintainable at said surface and capable of engaging said surface and rolling thereon; means secured to said shaft and rotating therewith, said means carrying said rolling bodies, and means for causing said rolling bodies to make rolling contact only with said surface for delivering a driving force to said reeling drum solely by rolling friction of the rolling bodies on said surface.

4. Reeling device for tapes comprising: a stationary plate; a driving shaft journaled in said plate; a reeling drum for supporting a spool and being coaxially journaled on said driving shaft; means rotating with said drum and defining a frictionally engageable surface; a plurality of cylindrical rolls capable of rolling on said surface; means secured to said shaft and rotating therewith, said last named means carrying said cylindrical rolls, means for causing said cylindrical rolls to make rolling contact only with said surface for delivering a driving force to said reeling drum solely by rolling friction of said cylindrical rolls on said surface.

5. Reeling device for tapes comprising: a stationary plate; a driving shaft journaled in said plate; a reeling drum for supporting a spool and being coaxially journaled on said driving shaft; means secured to and rotating with said drum and defining a frictionally engageable surface; a plurality of balls in rolling contact with said surface; and having rolling contact with said balls and means secured to said shaft, rotating therewith and imparting a rolling motion upon said balls so as to provide driving connection to said surface.

6. Reeling device for tapes comprising: a stationary plate; a driving shaft journaled in said plate; a reeling drum for supporting a spool and being coaxially journaled on said driving shaft; means rotating with said drum and defining a frictionally engageable surface; a plurality of conical shaped rollers rolling on said surface; and means secured to said shaft and rotating therewith and carrying said rollers, and means causing said rollers to make rolling contact only with said surface for delivering a driving force to said reeling drum solely by rolling friction of said rollers on said surface.

7. Reeling device for tapes comprising: a stationary plate; a driving shaft journaled in said plate; a reeling drum for supporting a spool and being coaxially journaled on said driving shaft; means rotating with said drum and defining a frictionally engageable surface having axially and radially directed contiguous surface portions; a plurality of rolling bodies mounted for rolling contact only with said surface portions and rolling thereon; and means secured to said shaft and rotating therewith and engaging said rolling bodies for rolling them along said surface portions for thereby delivering a driving force to said drum solely by rolling friction of said rolling bodies on said surface portions.

8. Reeling device as set forth in claim 7, said surface being an annular ball cup.

9. Reeling device as set forth in claim 7, said surface being a cylinder conus.

10. Reeling device for tapes comprising: a stationary plate; a driving shaft journaled in said plate; a reeling drum for supporting a spool and being coaxially journaled on said driving shaft; means rotating with said drum and defining a frictionally engageable surface; a plurality of rolling bodies mounted for engagement with said surface and rolling thereon; and means secured to said shaft and rotating therewith engaging said rolling bodies for rolling them along said surface; and spring means for adjustably urging said rolling bodies against said surface.

11. Reeling device for tapes comprising: a stationary plate; a driving shaft journaled in said plate; a reeling drum for supporting a spool and being coaxially journaled on said driving shaft; means rotating with said drum and defining a frictionally engageable surface, said means being of elastic material; a plurality of rolling bodies mounted for engagement with said surface and rolling thereon; and means secured to the said shaft and rotating therewith engaging said rolling bodies for rolling them along said surface for delivering a driving force to said reeling drum solely by rolling friction of said rolling bodies on said surface.

12. Reeling device for tapes comprising: a stationary plate; a driving shaft journaled in said plate; a reeling drum for supporting a spool and being coaxially journaled on said driving shaft; means rotating with said drum and defining a frictionally engageable surface; a plurality of rolling bodies made of elastic material and mounted for engagement with said surface and rolling thereon; and means secured to said shaft and rotating therewith engaging said rolling bodies for rolling them along said surface for delivering a driving force to said reeling drum solely by rolling friction of said rolling bodies on said surface.

13. Reeling device for tapes comprising: a stationary plate; a driving shaft journaled in said plate; a reeling drum for supporting a spool and being coaxially journaled on said driving shaft; means rotating with said drum and defining a frictionally engageable surface; a roller carrier secured on said shaft and rotating therewith inside of said drum; a plurality of rollers on said carrier radially displaceable for frictional engaging with and disengaging from said surface, said rollers upon engaging said surface rolling thereon and drivingly connecting said shaft to said drum solely by rolling friction of the rollers on said surface.

14. Reeling device for tapes comprising: a stationary plate; a driving shaft journaled in said plate; a reeling drum for supporting a spool and being coaxially journaled on said driving shaft; means rotating with said drum and defining a frictionally engageable surface; a roller carrier on said shaft rotating therewith inside said drum, said roller carrier having a plurality of pairs of axially aligned radially directed guiding slots; a plurality of bolts respectively journaled in said pairs of slots and being radially displaceable therein; and rollers on said bolts rotating therewith and being capable of rolling on said surface by frictional engagement therewith for drivingly connecting said shaft with carrier to said drum.

15. Device as set forth in claim 14, said bolts having flat portions, and springs engaging said flat portions for radially, outwardly urging said bolts with rollers against said surface.

16. Reeling device for tapes comprising: a stationary plate; a driving shaft journaled in said plate; first and second coaxial reeling drums journaled on said shaft; means rotating with each said drum and defining frictionally engageable first and second rotational surfaces; a first plurality of rolling bodies mounted for rotating contact with said first surface; a second plurality of rolling bodies mounted for rotating contact with said second surface; means secured to said shaft for rotation therewith and engaging said rolling bodies so as to impart rolling motion thereto along said surfaces when the shaft rotates, and means for causing said rolling bodies to engage said surfaces with rolling motion only thereby to deliver a driving force to each of said reeling drums solely by rolling friction of said rolling bodies on said surfaces.

17. Device as set forth in claim 16, said last mentioned means comprising two coaxial carriers having guiding slots for said rolling bodies for permitting radial displacement thereof.

18. Device as set forth in claim 16, said last mentioned means being a single disc having two coaxial ball cups, said rolling bodies being balls in said cups and rolling over said surfaces.

19. Reeling device for tapes comprising: a stationary plate; an electromagnet on said plate; a driving shaft journaled in said plate; axially displaceable disc means on said shaft rotating therewith; a reeling drum for supporting a spool and journaled on said shaft; means rotating with said drum and defining a frictionally engageable surface; armature means on said disc means cooperating with said electromagnet; a plurality of rolling bodies for drivingly engaging said disc means and rolling on said rolling surface; and spring means for normally urging said disc means and rolling bodies against said surface.

20. Reeling device for tapes comprising: a stationary plate; an electromagnet on said plate; a driving shaft journaled in said plate; first disc means on said shaft rotating therewith and having rolling surfaces; a reeling drum for supporting a spool and being journaled on said shaft; second disc means having a rolling surface and being axially displaceably connected to said drum, following the rotation thereof; armature means on said second disc means cooperating with said electromagnet; rolling bodies interposed between said two surfaces providing for driving connection in-between; and spring means for urging said two disc means axially against each other for maintaining said driving connection.

21. Reeling device for tapes comprising: a stationary plate; an electromagnet on said plate; a driving shaft journaled in said plate; a reeling drum for supporting a spool journaled on said shaft; first and second disc means for defining two coaxial rolling surfaces, and being axially displaceable to each other, said first disc means rotating with said drum, said second disc means rotating with said shaft; armature means on one of said discs defining means cooperating with said magnet; a plurality of rolling bodies interposed between said surfaces and providing roller bearing power transmission between said shaft and said said drum; and means for limiting said axial displacement as caused by attraction of said armature by said magnet so that an air-gap remains between armature and magnet.

22. Reeling device for tapes comprising: a stationary plate; an electromagnet on said plate; a driving shaft journaled in said plate; a reeling drum for supporting a spool journaled on said shaft; first and second means for defining two coaxial rolling surfaces, said first means rotating with said drum, said second means rotating with said shaft; armature means cooperating with said magnet for axially displacing said first and second means to each other; a plurality of rolling bodies interposed between said surfaces and providing roller bearing power transmission between said shaft and said drum; and two springs cooperating with said armature and permitting different axial displacement upon differently strong energization of said magnet.

23. Device as set forth in claim 22, said magnet being provided with a friction brake layer cooperating with that disc carrying said armature.

24. Device as set forth in claim 21, said first means being positively connected to said drum, said second means being secured to said shaft.

25. Device as set forth in claim 21, said first means being secured to said drum, said second means being positively and axially displaceably connected to said shaft.

26. Reeling device for tapes comprising: stationary plate means; a driving shaft journaled in said plate; first and second individually energizable electromagnet means on said plate means, and being disposed coaxially to said shaft; a reeling drum journaled on said shaft; a brake disc including armature means cooperating with said first magnet and being drivingly connected to said drum and axially displaceable relative to said shaft; means rotating with said drum and defining a rotational rolling surface; a plurality of rolling bodies capable of rolling on said surface; means rotating with said shaft for imparting a rolling motion upon said rolling bodies; and an armature integral with one of said rotating means cooperating with said second magnet for governing the driving connection between said two rotating means.

27. Device as set forth in claim 26, wherein said means rotating with said drum is a spring biased, axially displaceable disc which includes the armature cooperating with said second magnet.

28. Device as set forth in claim 26, wherein said means rotating with said shaft includes pivotable armatures cooperating with said second magnet, said rolling bodies being cylinder rolls rotatably mounted on said armatures for running over a cylindrical mantle surface pertaining to said drum and rotating therewith.

29. Device as set forth in claim 28, said armatures having radially directed slots each receiving a screw secured to said means rotating with said shaft, said screws limiting radial movement of said armatures.

30. Reeling device for tapes comprising: a stationary plate; an electromagnet on said plate; a driving shaft journaled in said plate; a reeling drum for supporting a spool and journaled on said shaft; means on one of said shaft and said drum rotating therewith and defining a frictionally engageable surface; a plurality of rolling bodies mounted for engagement with said surface and rolling thereon; and means positively connected to the other one of said shaft and rotating therewith engaging said rolling bodies for rolling them along said surface, one of said rotating means being axially displaceable by said magnet to place said rolling bodies in and out of engagement with said surface to regulate the driving force imparted to said reeling drum.

References Cited by the Examiner

UNITED STATES PATENTS

| | | | |
|---|---|---|---|
| 2,002,699 | 5/1935 | Larsen | 192—103 |
| 2,349,018 | 5/1944 | Tasker | 242—55.12 |
| 2,394,085 | 2/1946 | Loughridge | 192—44 |
| 2,561,745 | 7/1951 | Lerch | 242—72 |

MERVIN STEIN, *Primary Examiner.*